(12) United States Patent
Lee et al.

(10) Patent No.: US 11,926,212 B2
(45) Date of Patent: Mar. 12, 2024

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Sang Heun Lee, Seoul (KR); Dongjin Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 647 days.

(21) Appl. No.: 17/115,474

(22) Filed: Dec. 8, 2020

(65) Prior Publication Data

US 2022/0011442 A1 Jan. 13, 2022

(30) Foreign Application Priority Data

Jul. 7, 2020 (KR) .................... 10-2020-0083650

(51) Int. Cl.
*B60K 35/00* (2006.01)
(52) U.S. Cl.
CPC ........ *B60K 35/00* (2013.01); *B60K 2370/157* (2019.05); *B60K 2370/164* (2019.05)
(58) Field of Classification Search
CPC .............. B60K 35/00; B60K 2370/157; B60K 2370/164; B60K 2370/119; B60K 2370/166; B60K 2370/586; B60K 2370/152; H04H 20/53; H04H 20/62; H04H 40/72; H04H 40/90; G10L 21/0208; B60R 16/023; H04B 17/318; H04B 1/082; H04B 7/0814; H04R 2499/13; H04W 52/24

See application file for complete search history.

(56) References Cited

U.S. PATENT DOCUMENTS

| 8,769,587 | B2 * | 7/2014 | Lee | H04B 1/082 |
| | | | | 455/3.06 |
| 9,667,296 | B2 * | 5/2017 | Kim | H04B 1/08 |
| 2007/0127727 | A1 * | 6/2007 | Jeong | H04H 40/72 |
| 2007/0268415 | A1 * | 11/2007 | Ukyou | H04S 7/30 |
| | | | | 381/17 |
| 2010/0220818 | A1 * | 9/2010 | Yamamoto | H04H 40/72 |
| | | | | 375/340 |
| 2014/0018006 | A1 * | 1/2014 | Petrucci | H04W 52/24 |
| | | | | 455/66.1 |
| 2020/0169625 | A1 * | 5/2020 | Shim | H04M 1/0277 |
| 2022/0417700 | A1 * | 12/2022 | Lee | H04H 20/62 |

FOREIGN PATENT DOCUMENTS

| JP | 2009288017 A | * | 12/2009 | |
| KR | 20010048342 A | | 6/2001 | |
| WO | WO-2011012054 A1 | * | 2/2011 | ......... G10L 21/0208 |

* cited by examiner

*Primary Examiner* — Lana N Le
(74) *Attorney, Agent, or Firm* — Lempia Summerfield Katz LLC (57) ABSTRACT

A vehicle includes a Global Navigation Satellite System (GNSS) antenna, a broadcast receiving antenna, a speaker, and an Audio/Video/Navigation (AVN) device electrically connected to the GNSS antenna, the broadcast receiving antenna, and the speaker, and the AVN device is configured to obtain a broadcast signal from the broadcast receiving antenna, receive a GNSS signal from the GNSS antenna, demodulate the broadcast signal into an acoustic signal, and remove a noise mixed in the acoustic signal based on an intensity of the GNSS signal.

14 Claims, 8 Drawing Sheets

| MODE | SOUND CLARITY | NOISE CONTROL |
|---|---|---|
| ⊚ORIGINAL SOUND ENHANCEMENT MODE (210) IN THE ORIGINAL SOUND ENHANCEMENT MODE A SOUND QUALITY FAITHFUL TO ORIGINAL RADIO SOUND IS PROVIDED. HOWEVER, NOISE MAY SOUND ROUGH | TOP MIDDLE BOTTOM (sound clarity: top-middle; noise control: bottom) | |
| ⊚ORIGINAL SOUND/NOISE BALANCE MODE (220) IN THE ORIGINAL SOUND/NOISE BALANCE MODE A BALANCED CONTROL OF ORIGINAL SOUND AND NOISE OF RADIO IS PROVIDED | TOP MIDDLE BOTTOM (sound clarity: bottom; noise control: middle) | |
| ⊚NOISE MINIMIZATION MODE (230) IN THE NOISE MINIMIZATION MODE AN OCCURRENCE OF RADIO NOISE IS MINIMIZED. HOWEVER, VOLUME OF ORIGINAL RADIO SOUND MAY CHANGE | TOP MIDDLE BOTTOM (sound clarity: bottom; noise control: top) | |
| ⊚AUTOMATIC MODE (240) IN THE AUTOMATIC MODE AUTOMATICALLY, THE MODE IS ADJUSTED ACCORDING TO INTENSITY OF BROADCAST SIGNAL | TOP MIDDLE BOTTOM | |

FIG. 3

| | | MENU | 5:11PM | FEBRUARY 18(TUE) |
|---|---|---|---|---|
| 🔍 | BEEP | SOUND SETTING | | |
| AUDIO | | ○ ORIGINAL SOUND ENHANCEMENT MODE<br>IN THE ORIGINAL SOUND ENHANCEMENT MODE A SOUND QUALITY FAITHFUL TO ORIGINAL RADIO SOUND IS PROVIDED. HOWEVER, NOISE MAY SOUND ROUGH. | | ~310 |
| GUIDE SOUND | | ○ ORIGINAL SOUND/NOISE BALANCE MODE<br>IN THE ORIGINAL SOUND/NOISE BALANCE MODE A BALANCED CONTROL OF ORIGINAL SOUND AND NOISE OF RADIO IS PROVIDED. | | ~320 |
| SYSTEM VOLUME | | ○ NOISE MINIMIZATION MODE<br>IN THE NOISE MINIMIZATION MODE AN OCCURRENCE OF RADIO NOISE IS MINIMIZED. HOWEVER, VOLUME OF ORIGINAL RADIO SOUND MAY CHANGE. | | ~330 |
| FM RADIO NOISE CONTROL | | | | |
| RESET | | ● AUTOMATIC MODE<br>IN THE AUTOMATIC MODE AUTOMATICALLY, THE MODE IS ADJUSTED ACCORDING TO INTENSITY OF BROADCAST SIGNAL. | | ~340 |

VEHICLE AND CONTROL METHOD THEREOF

CROSS-REFERENCE TO RELATED APPLICATION

This application claims the benefit of Korean Patent Application No. 10-2020-0083650, filed on Jul. 7, 2020, in the Korean Intellectual Property Office, the disclosure of which is incorporated herein by reference.

BACKGROUND

1. Field

The disclosure relates to a vehicle and a control method thereof, and more particularly, to a vehicle including a global navigation satellite system and a broadcast reception system, and a control method thereof.

2. Description of the Related Art

In general, a vehicle refers to a moving device or a transport device which travels on a road or a track by using fossil fuel, electricity, or the like as a power source.

The vehicle serves as a living space to provide relaxation to a driver beyond merely being the moving device or the transport device. In addition, various vehicle audio systems and video systems are installed in vehicles to provide comfort and rest to the driver.

In particular, driver often listens to audio broadcasts through an audio system.

However, when a vehicle enters a weak electric field region in which the reception rate of a broadcast signal is low, a signal-to-noise ratio (SNR) of the received signal is lowered, and a large amount of noise may be included in the listening sound.

SUMMARY

Therefore, it is an aspect of the present disclosure to provide a vehicle having a broadcast reception system that provide various sound modes to a driver according to a degree of noise removal, and a control method thereof.

In addition, it is another aspect of the present disclosure to provide a vehicle including a broadcast reception system that automatically adjusts the degree of noise removal according to the reception strength of a broadcast signal, and a control method thereof.

In accordance with one aspect of the present disclosure, a vehicle includes: a Global Navigation Satellite System (GNSS) antenna; a broadcast receiving antenna; a speaker; and an Audio/Video/Navigation (AVN) device electrically connected to the GNSS antenna, the broadcast receiving antenna, and the speaker. The AVN device is configured to obtain a broadcast signal from the broadcast receiving antenna, receive a GNSS signal from the GNSS antenna, demodulate the broadcast signal into an acoustic signal, and remove a noise mixed in the acoustic signal based on an intensity of the GNSS signal.

The AVN device may be configured to operate in an acoustic mode among a plurality of acoustic modes, and remove noise from the acoustic signal at different levels in different acoustic modes.

The AVN device may be configured to operate in different acoustic modes based on the intensity of the GNSS signal.

The AVN device may be configured to operate in a first acoustic mode in response to the intensity of the GNSS signal being greater than the reference intensity and operate in a second acoustic mode in response to the intensity of the GNSS signal being the reference intensity or less.

The noise removal level in the second acoustic mode may be greater than a noise removal level in the first acoustic mode.

The AVN device may further include a display device allowing a driver to select any one of the plurality of acoustic modes.

The AVN device may be configured to change to an acoustic mode having a noise removal level greater than the acoustic mode selected by the driver in response to the intensity of the GNSS signal being the reference intensity or less.

In accordance with another aspect of the present disclosure, a control method of a vehicle including a Global Navigation Satellite System (GNSS) antenna, a broadcast receiving antenna, and a speaker, includes: receiving a broadcast signal through the broadcast receiving antenna; receiving a GNSS signal through the GNSS antenna; demodulating the broadcast signal into an acoustic signal; and removing a noise mixed in the acoustic signal based on an intensity of the GNSS signal.

In accordance with another aspect of the present disclosure, a vehicle includes: a Global Navigation Satellite System (GNSS) antenna; a broadcast receiving antenna; a speaker; and an AVN device electrically connected to the GNSS antenna, the broadcast receiving antenna, and the speaker, and the AVN device may be configured to obtain a broadcast signal from the broadcast receiving antenna, receive a GNSS signal from the GNSS antenna, demodulate the broadcast signal into an acoustic signal, identify a location of the vehicle based on the GNSS signal and remove a noise mixed in the acoustic signal based on whether the vehicle is located within the weak electric field area.

The AVN device may be configured to operate in an acoustic mode among a plurality of acoustic modes, and remove noise from the acoustic signal at different levels in different acoustic modes.

The AVN device may be configured to operate in different acoustic modes based on whether the vehicle is located in the weak electric field area.

The AVN device may be configured to operate in a first acoustic mode in response to the vehicle not being located in the weak electric field area, and operate in a second acoustic mode in response to the vehicle being located in the weak electric field area.

The noise removal level in the second acoustic mode may be greater than a noise removal level in the first acoustic mode.

The AVN device may further include a display device allowing a driver to select any one of the plurality of acoustic modes.

The AVN device may be configured to change to an acoustic mode having a noise removal level greater than the acoustic mode selected by the driver in response to the vehicle being located in the weak electric field area.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, embodiments are described more fully hereinafter with reference to the accompanying drawings. The embodiments may, however, be embodied in many different forms and should not be construed as being limited to the embodiments set forth herein. These embodiments are provided so that this disclosure may be thorough and complete and convey the embodiments to those of ordinary skill in the art. Like numerals denote like elements throughout.

It should be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It should be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference is in detail to the embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, an operation principle and embodiments of the present disclosure are described with reference to the accompanying drawings.

Figure 1:
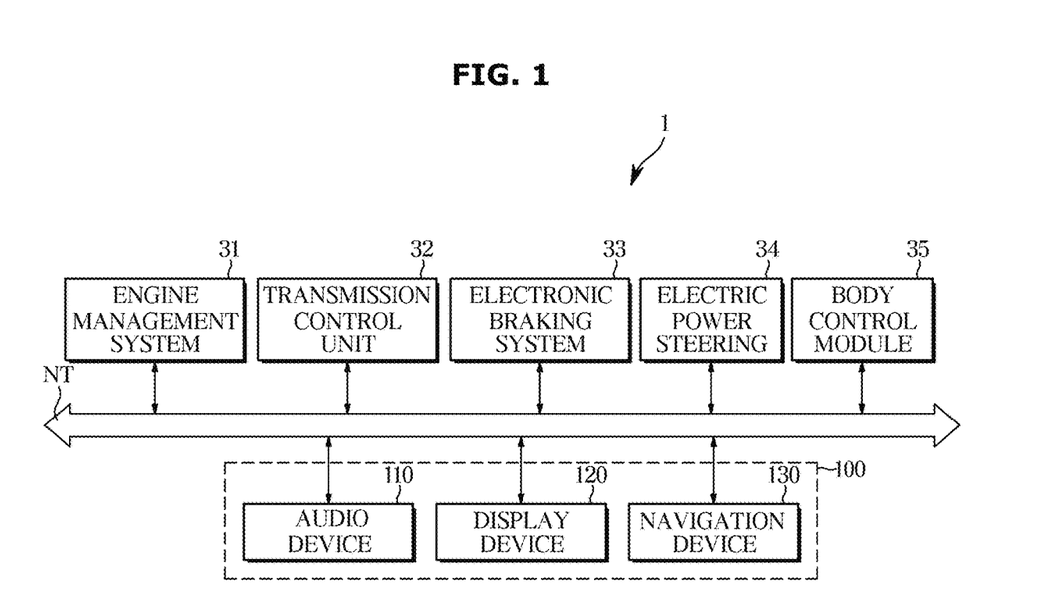
FIG. 1 illustrates a configuration of a vehicle according to an embodiment.

FIG. 1 illustrates a configuration of a vehicle according to an embodiment.

Referring to FIG. 1, vehicle 1 includes an engine management system (EMS) 31, a transmission control unit (TCU) 32, and an electronic braking system (EBS) 33, Electric Power Steering (EPS) 34, body control module (BCM) 35, Audio/Video/Navigation (AVN) device 100.

The AVN device 100 may include an audio device 110, a display device 120, and a navigation device 130. Depending on the vehicle, the audio device 110, the display device 120, and the navigation device 130 may be provided separately.

The audio device 110 may provide various information and entertainment to the driver through sound. For example, the audio device 110 may play an audio file stored in an internal storage medium or an external storage medium according to a driver's command, and may output sound included in the reproduced audio file. The audio device 110 may receive sound data from a user device such as a portable computer, a portable communication device, and a portable media player, and output sound corresponding to the received sound data. Additionally, the audio device 110 may receive an audio broadcast signal and output a sound corresponding to the received audio broadcast signal.

The display device 120 may provide various information and entertainment to the driver through images and sounds. For example, the display device 130 plays a video file stored in an internal storage medium or an external storage medium (Compact Disk: CD, USB storage medium, etc.) according to a driver's command, and displays an image included in the reproduced video file, and outputs sound. In addition, the display device 120 may receive a video broadcast signal, display an image included in the video broadcast, and output sound.

The navigation device 130 is generally provided integrally with the display device 120, and may generate a route to a destination input by the driver according to the driver's input, and display the generated route on the display device 120. For example, the navigation device 130 may receive a GNSS signal through a Global Navigation Satellite System (GNSS) and identify the location of the vehicle 1 based on the GNSS signal. The navigation device 130 may generate a route to the destination based on the location (coordinates) of the destination input by the driver and the current location (coordinates) of the vehicle 1.

As such, the vehicle 1 is provided with an AVN device 100 in which the audio device 110, the display device 120, and the navigation device 130 are integrated, or the audio device 110, the display device 120 and the navigation device may be provided separately.

In addition, the vehicle 1 may further include an electric component for protecting the driver and providing convenience to the driver. For example, the vehicle 1 may include electronic components 30 such as a door lock, a wiper, a power seat, a seat heater, a cluster, a room lamp, a navigation system, and a multi-function switch.

The electrical components of the vehicle 1 may communicate with each other through a vehicle communication network NT. For example, electronic components transmit and receive data through Ethernet, Media Oriented Systems Transport (MOST), Flexray, Controller Area Network (CAN), and Local Interconnect Network (LIN).

Figure 2:
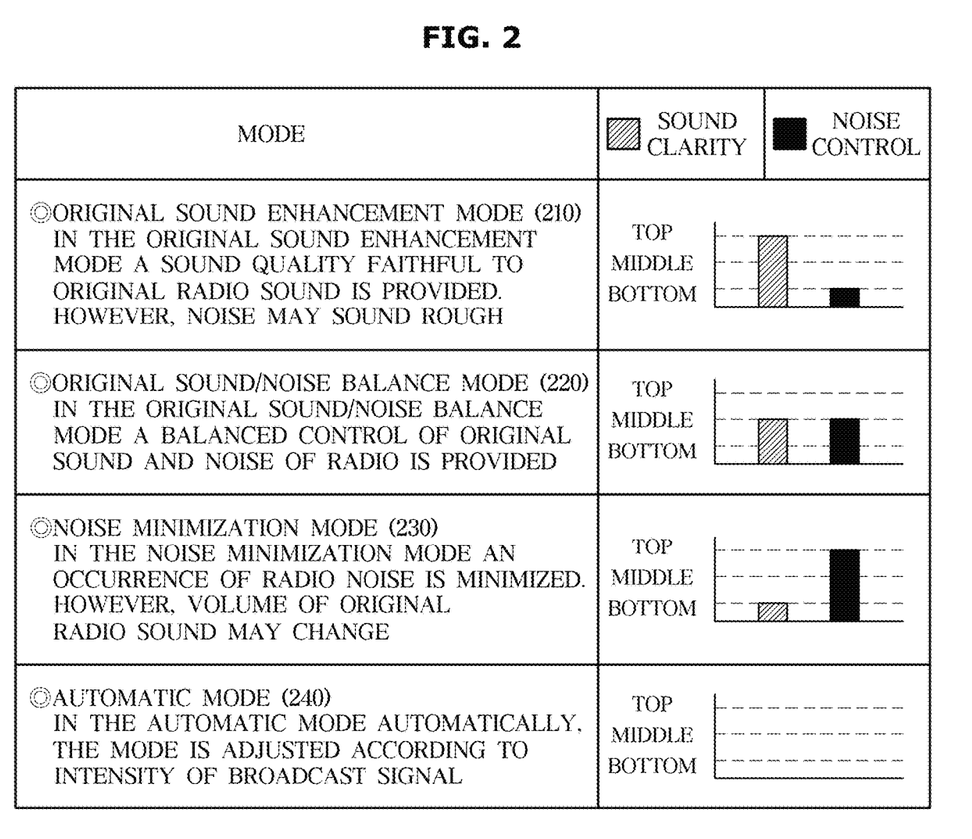
FIG. 2 illustrates a plurality of acoustic modes provided by a vehicle according to an embodiment.
Figure 3:
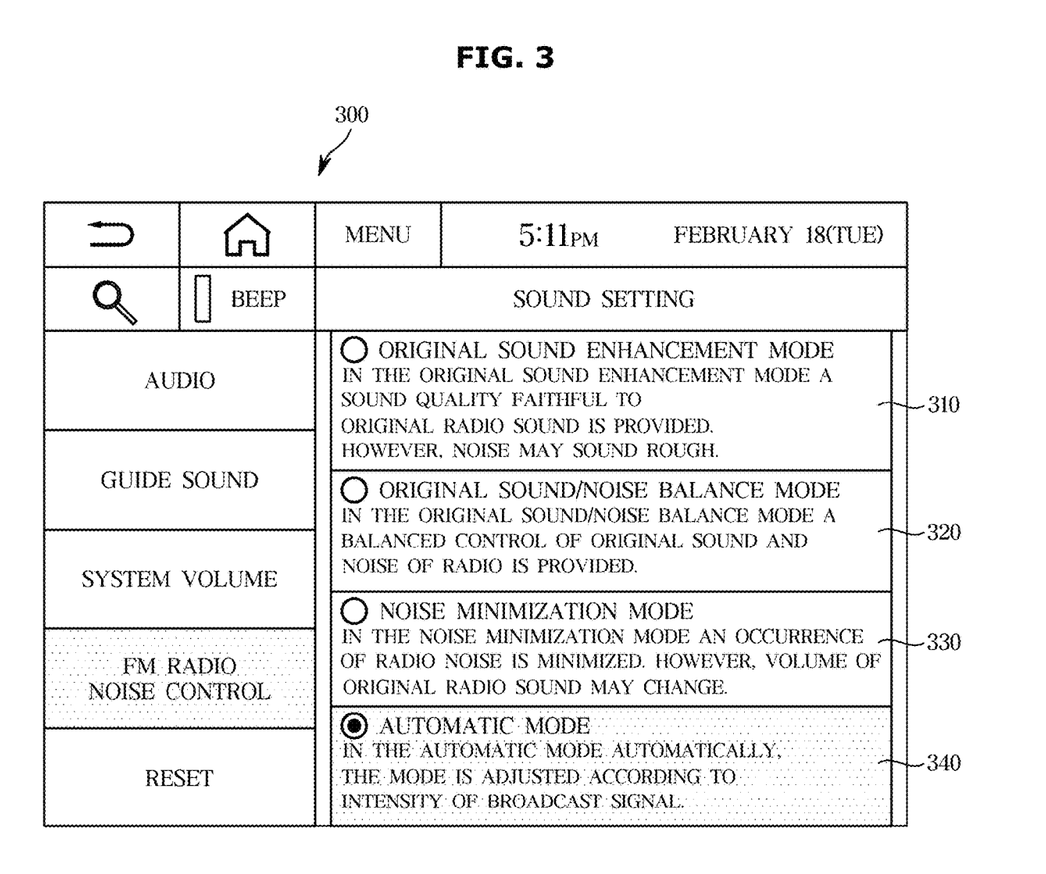
FIG. 3 illustrates a screen for selecting any one of a plurality of acoustic modes provided by a vehicle according to an embodiment.

FIG. 2 illustrates a plurality of acoustic modes provided by a vehicle according to an embodiment. FIG. 3 illustrates a screen for selecting any one of a plurality of acoustic modes provided by a vehicle according to an embodiment.

As described above, the AVN device 100 may perform all of the functions of the audio device 110, the display device 120, and the navigation device 130.

The AVN device 100 may obtain an audio broadcast signal and output a broadcast sound corresponding to the audio broadcast signal. In particular, the AVN device 100 may provide various acoustic modes to improve broadcast sound quality. The AVN device 100 may remove noise from an acoustic signal at different noise removal levels in different acoustic modes.

For example, as shown in FIG. 2, the AVN device 100 may provide an original sound enhancement mode 210, an original sound/noise balance mode 220, a noise minimization mode 230, and an automatic mode 240.

In the original sound enhancement mode 210, the AVN device 100 of the vehicle 1 may provide sound faithful to the original broadcast sound. Specifically, the AVN device 100 may minimize noise removal for an acoustic signal by a noise removal module (or algorithm) provided in the AVN device 100 and may convert the received audio broadcast signal into sound as it is.

In an area where the intensity of the audio broadcast signal is strong and the reception rate of the audio broadcast signal is high (hereinafter referred to as "strong electric field area"), the AVN device 100 of the original sound enhancement mode 210 may provide excellent quality broadcast sound to the driver. However, in an area where the intensity of the audio broadcast signal is weak and the reception rate of the audio broadcast signal is low, a sound mixed with strong noise may be provided.

In contrast, in the noise minimization mode 230, the AVN device 100 of the vehicle 1 may provide a sound minimizing noise mixed with the received broadcast signal. Specifically, the AVN device 100 maximizes noise removal for an acoustic signal by a noise removal module (or algorithm) provided in the AVN device 100 and outputs a sound from which noise is removed to the maximum.

In an area where the intensity of the audio broadcast signal is weak and the reception rate of the audio broadcast signal is low (hereinafter referred to as "weak electric field area"), the AVN device 100 in the noise minimization mode 230 may provide a sound in which noise mixed in the received broadcast signal is removed to the maximum. However, since the noise is removed and the original sound of the broadcast signal is also removed, a sound modified from the original sound may be provided.

In the original sound/noise balance mode 220, the AVN device 100 of the vehicle 1 may remove the noise mixed with the acoustic signal at an intermediate level between the original sound enhancement mode 210 and the noise minimization mode 230. Thereby, the AVN device 100 may provide sound of an appropriate quality in both the strong electric field area and weak electric field area modes. However, the AVN device 100 in the original sound/noise balance mode 220 may not provide very good quality sound in both the strong electric field area and the weak electric field area mode.

In the automatic mode 240, the AVN device 100 of the vehicle 1 may change the acoustic mode based on the intensity of the audio broadcast signal and/or the position of the vehicle 1. For example, the AVN device 100 in the automatic mode 240 may operate in the original sound enhancement mode 210 in a strong electric field area, and may operate in the noise minimization mode 230 in a weak electric field area.

In addition, the AVN device 100 may provide a menu for a driver to select various acoustic modes according to his or her taste.

For example, the AVN device 100 may display the acoustic mode selection screen 300 as shown in FIG. 3.

The acoustic mode selection screen 300 may include a first area 310 for selecting the original sound enhancement mode 210, a second area 320 for selecting the original sound/noise balance mode 220, and a third area 330 for selecting the noise minimization mode 230 and a fourth area 340 for selecting the automatic mode 240.

The driver may select any one of a plurality of acoustic modes displayed on the acoustic mode selection screen 300 by using a button, a dial or a touch panel provided on the vehicle 1.

In particular, when the driver selects the automatic mode 240, the AVN device 100 estimates the reception intensity of the audio broadcast signal or the reception rate of the audio broadcast signal, and may select any one of the plurality of acoustic modes based on the reception intensity of the audio broadcast signal or the reception rate of the audio broadcast signal.

Hereinafter, the operation of the AVN device 100 in the automatic mode 240 will be described.

Figure 4:
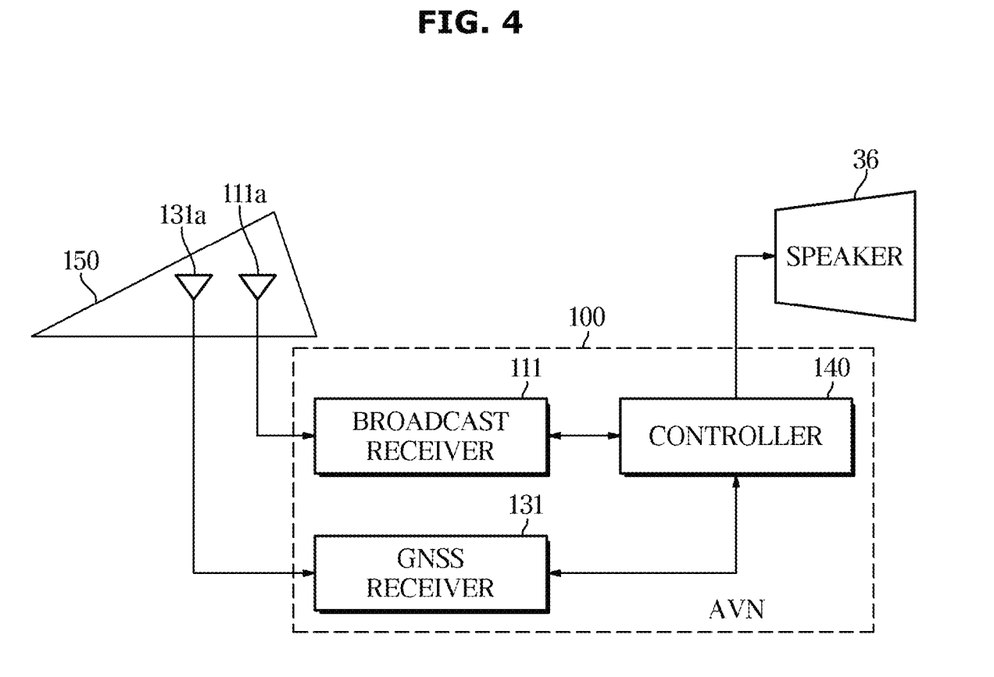
FIG. 4 illustrates an example of an AVN device included in a vehicle according to an embodiment.

FIG. 4 illustrates an example of an AVN device included in a vehicle according to an embodiment.

As shown in FIG. 4, the AVN device 100 includes a broadcast receiver 111 and a Global Navigation Satellite System (GNSS) receiver 131 and a controller 140. In addition, the vehicle 1 may be provided with an antenna device 150 and a speaker 36.

The antenna device 150 of the vehicle 1 includes a broadcast receiving antenna 111a and a GNSS receiving antenna 131a. The broadcast receiving antenna 111a may have a dimension for receiving a signal in a frequency band of audio broadcasting (e.g., a band of hundreds of kHz to thousands of kHz and a band of tens of MHz to hundreds of MHz). In addition, the GNSS receiving antenna 131a may have a dimension for receiving a signal in a frequency band (e.g., 1575.42 MHz or 1227.60 MHz, etc.) of a GNSS satellite signal.

The GNSS antenna 131a may provide the received GNSS signal to the GNSS receiver 131. The broadcast receiving antenna 111a may provide the received audio broadcast signal to the broadcast receiver 111.

The GNSS receiver 131 may obtain a GNSS signal from the GNSS antenna 131a, and may evaluate the reception intensity of the GNSS signal or the reception rate of the GNSS signal. The GNSS receiver 131 may compare the intensity of the received GNSS signal with a predetermined reference intensity, and may identify whether the intensity of the received GNSS signal is greater than the reference intensity. When the intensity of the received GNSS signal is greater than the reference intensity, the GNSS receiver 131 may identify the reception of the GNSS signal. In addition, when the intensity of the received GNSS signal is not greater than the reference intensity, the GNSS receiver 131 may identify the non-reception of the GNSS signal. The GNSS receiver 131 may provide information on whether to receive a GNSS signal to the controller 140.

In addition, when reception of the GNSS signal is identified, the GNSS receiver 131 may demodulate the GNSS signal and identify the position of the vehicle 1 based on the demodulated signal. The GNSS receiver 131 may provide information on the location of the vehicle 1 to the controller 140.

The broadcast receiver 111 may obtain a broadcast signal from the broadcast receiving antenna 111a and demodulate the broadcast signal. The demodulated broadcast signal may include an acoustic signal by an audio broadcast signal. The broadcast receiver 111 may provide an acoustic signal demodulated from the broadcast signal to the controller 140.

The controller 140 may include a memory configured to store programs and data for generating control signals for processing input signals and controlling the AVN device 100 and a processor configured to process input signals and generate control signals according to program and data stored in the memory.

The controller 140 may receive information on whether to receive a GNSS signal from the GNSS receiver 131 and/or information on the location of the vehicle 1. In addition, the controller 140 may generate a route from the current location to the destination based on the current location of the vehicle 1 and the destination input by the driver.

The controller 140 may receive an acoustic signal demodulated from an audio broadcast signal obtained from the broadcast receiver 111. The controller 140 may process the received acoustic signal and provide the processed acoustic signal to the speaker 36 of the vehicle 1. The speaker 36 may convert an electrical acoustic signal received from the controller 140 into sound.

Also, the controller 140 may remove noise mixed in the acoustic signal according to the acoustic mode selected by the user. For example, in the original sound enhancement mode 210, the controller 140 may minimize noise removal, and in the noise minimization mode 230, the controller 140 may maximize noise removal.

In particular, in the automatic mode 240, the controller 140 may select any one of a plurality of acoustic modes based on whether a GNSS signal is received.

The GNSS signal is transmitted from the satellite, and the broadcast signal is transmitted from the transmission tower. Both the GNSS signal and the broadcast signal may be transmitted to the vehicle 1 from a source located at a very long distance from the vehicle 1. Therefore, in general, the intensity of the broadcast signal is also weak at the location where the intensity of the GNSS signal is weak. In other words, the weak electric field area of the GNSS signal is very similar to the weak electric field area of the broadcast signal. For example, both the intensity of the GNSS signal and the intensity of the broadcast signal are weak in the tunnel, and the intensity of the GNSS signal and the intensity of the broadcast signal are also weak underground.

For this reason, the controller 140 may estimate the intensity of the broadcast signal based on the intensity of the received GNSS signal without directly evaluating the intensity of the received broadcast signal. For example, when a GNSS signal is received from the GNSS receiver 131, the controller 140 may identify that a broadcast signal is also received. In addition, when that a GNSS signal is not received from the GNSS receiver 131, the controller 140 may identify that a broadcast signal is not also received. As such, the controller 140 may identify reception or non-reception of a broadcast signal based on reception or non-reception of a GNSS signal.

The controller 140 may also select one of a plurality of acoustic modes based on the reception or non-reception of the GNSS signal, and process the acoustic signal obtained from the broadcast receiver 111 based on the selected acoustic mode. For example, the controller 140 may operate in the original sound enhancement mode 210 when a GNSS signal is received. When a GNSS signal is received, the controller 140 may minimize noise removal and output an acoustic signal received from the broadcast receiver 111 to the speaker 36. In addition, the controller 140 may operate in the noise minimization mode 230 when a GNSS signal is not received. When the GNSS signal is not received, the controller 140 maximizes noise removal and outputs an acoustic signal from which noise is removed to the speaker 36.

The controller 140 may change the acoustic mode step by step so that noise removal is increased in response to non-reception of the GNSS signal. For example, when the driver selects the original sound enhancement mode 210, the controller 140 may change the acoustic mode to the original sound/noise balance mode 220 based on non-reception of the GNSS signal. When the driver selects the original sound/noise balance mode 220, the controller 140 may change the acoustic mode to the noise minimization mode 230 based on non-reception of the GNSS signal. When the driver selects the noise minimization mode 230, the controller 140 may change the acoustic mode to silence based on non-reception of the GNSS signal. As such, the controller 140 may change to an acoustic mode that increases noise removal in response to non-reception of a GNSS signal.

The controller 140 may change the acoustic mode based on the non-reception of the GNSS signal and the driver's selection. For example, when the driver selects the original sound enhancement mode 210, the controller 140 may change the acoustic mode to the original sound/noise balance mode 220 based on the non-reception of the GNSS signal, and then change the acoustic mode to the noise minimization mode 230 when a predetermined time elapses. In addition, when the driver selects the original sound/noise balance mode 220, the controller 140 may change the acoustic mode to the noise minimization mode 230 based on non-reception of the GNSS signal.

The controller 140 may change to the acoustic mode previously selected by the driver in response to non-reception of the GNSS signal. For example, when the driver selects the original sound enhancement mode 210 in the strong electric field area and the original sound/noise balance mode 220 in the weak electric field area, in response to non-reception of the GNSS signal, the controller 140 may change the acoustic mode from the original sound enhancement mode 210 to the original sound/noise balance mode 220. Also, when the driver selects the original sound/noise balance mode 220 in the strong electric field area and the noise minimization mode 230 in the weak electric field area, in response to non-reception of the GNSS signal, the controller 140 may change the acoustic mode from the original sound/noise balance mode 220 to the noise minimization mode 230.

In addition, the controller 140 may control noise removal of the acoustic signal based on the intensity of the received GNSS signal. Specifically, the controller 140 may reduce the degree of noise removal as the intensity of the received GNSS signal becomes stronger, and may increase the degree of noise removal as the intensity of the received GNSS signal becomes weaker.

As described above, the AVN device 100 may operate in the automatic mode 240 among various acoustic modes, and in the automatic mode 240, the AVN device 100 may control noise mixed in the acoustic signal based on whether the GNSS signal is received or the intensity of the received GNSS signal.

Figure 5:
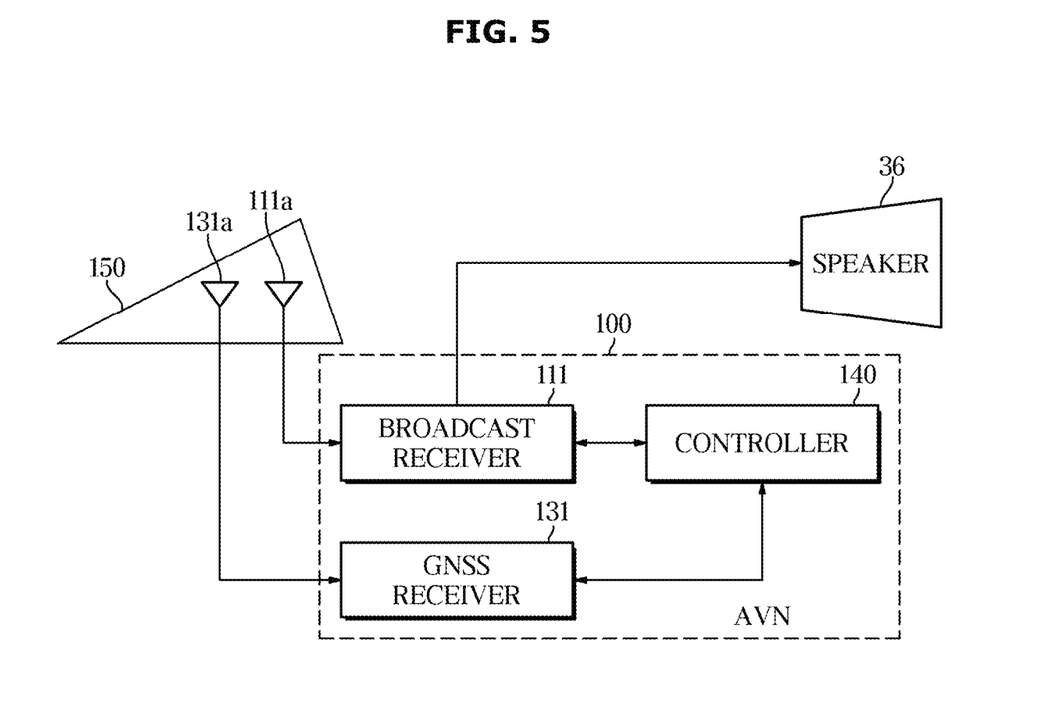
FIG. 5 illustrates another example of an AVN device included in a vehicle according to an embodiment.

FIG. 5 illustrates another example of an AVN device included in a vehicle according to an embodiment.

As shown in FIG. 5, the AVN device 100 includes a broadcast receiver 111, a GNSS receiver 131, and a controller 140.

The GNSS receiver 131 may be the same as the GNSS receiver 131 shown in FIG. 4. The antenna device 150 of the vehicle 1 may again include a broadcast receiving antenna 111a and a GNSS receiving antenna 131a. The broadcast receiver 111 may obtain a broadcast signal from the broadcast receiving antenna 111a and demodulate the broadcast signal. In addition, the broadcast receiver 111 may remove noise from the acoustic signal demodulated from the broadcast signal and transmit it to the speaker 36.

The controller 140 may receive information on whether to receive a GNSS signal from the GNSS receiver 131 and/or information on the location of the vehicle 1.

The controller 140 may control the broadcast receiver 111 to remove noise mixed in the acoustic signal according to the acoustic mode selected by the user. For example, in the original sound enhancement mode 210, the controller 140 may control the broadcast receiver 111 to minimize noise removal, in the noise minimization mode 230, the controller 140 may control the broadcast receiver 111 to maximize removal of noise.

In particular, in the automatic mode 240, the controller 140 may select any one of a plurality of acoustic modes based on whether or not a GNSS signal is received, and control the broadcast receiver 111 to remove noise according to the selected acoustic mode. The controller 140 may control the broadcast receiver 111 to remove noise according to the acoustic mode selected by various methods as described with reference to FIG. 4.

Figure 6:
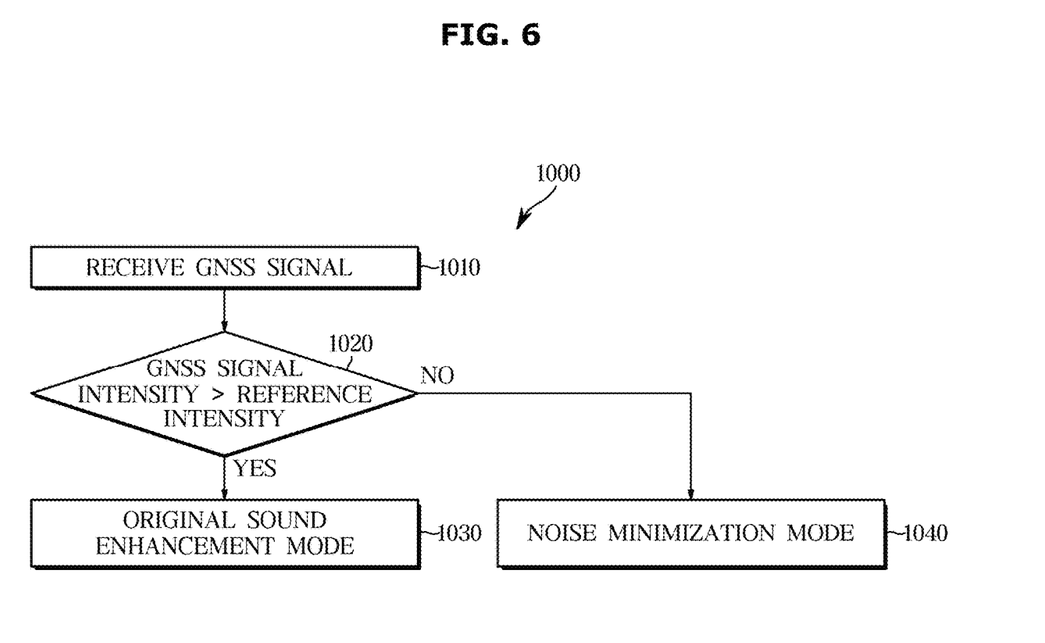
FIG. 6 illustrates an example of an operation of an AVN device included in a vehicle according to an embodiment.

FIG. 6 illustrates an example of an operation 1000 of an AVN device 100 included in a vehicle according to an embodiment. The AVN device may be the AVN device 100 of FIGS. 1, 4, and/or 5.

With FIG. 6, an operation 1000 of the AVN device 100 is described.

The AVN device 100 obtains a GNSS signal from an antenna device (1010).

The GNSS receiving antenna 131a may receive a GNSS signal and transmit the received GNSS signal to the AVN device 100.

The AVN device 100 determines whether the intensity of the received GNSS signal is greater than the reference intensity (1020).

The AVN device 100 may measure the intensity of the received GNSS signal and compare the intensity of the received GNSS signal with a reference intensity. The AVN device 100 may identify whether the intensity of the GNSS signal is greater than the reference intensity based on the comparison result.

When the intensity of the GNSS signal is greater than the reference intensity (YES in 1020), the AVN device 100 operates in the original sound enhancement mode 210 (1030).

In the original sound enhancement mode 210, the AVN device 100 may minimize noise removal for the acoustic signal received from the broadcast receiving antenna 111a. The AVN device 100 may transmit an acoustic signal with minimized noise removal to the speaker 36.

When the intensity of the GNSS signal is not greater than the reference intensity (No in 1020), the AVN device 100 operates in the noise minimization mode 230 (1040).

In the noise minimization mode 230, the AVN device 100 may maximize noise removal for an acoustic signal received by the broadcast receiving antenna 111a. The AVN device 100 may transmit an acoustic signal from which noise is removed to the maximum to the speaker 36.

In the above, it has been described that the AVN device 100 operates in an original sound enhancement mode or a noise minimization mode based on a comparison between GNSS signal intensity and reference intensity, but is not limited thereto. For example, the AVN device 100 may operate in any one of various modes based on a comparison between GNSS signal intensity and reference intensity. The AVN device 100 may operate in an original sound enhancement mode based on a GNSS signal intensity greater than or equal to the first reference intensity, operate in an original sound/noise balance mode based on a GNSS signal intensity less than the first reference intensity and greater than or equal to the second reference intensity and operate in a noise minimization mode based on a GNSS signal intensity less than a second reference intensity and greater than "0". Also, the AVN device 100 may operate in a silent mode based on non-reception of a GNSS signal.

Figure 7:
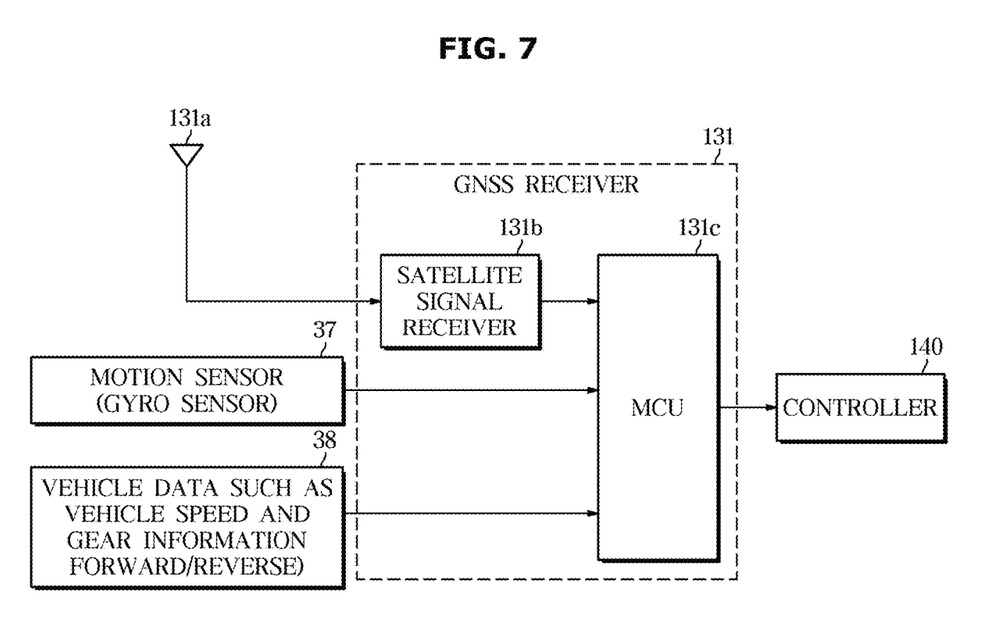
FIG. 7 illustrates another example of an AVN device included in a vehicle according to an embodiment.

FIG. 7 illustrates another example of an AVN device included in a vehicle according to an embodiment.

As shown in FIG. 7, the AVN device 100 includes a GNSS receiver 131 and a controller 140.

The GNSS receiver 131 includes a satellite signal receiver 131b and a microcontroller unit (MCU) 131c.

The satellite signal receiver 131b may obtain a GNSS signal from the GNSS receiving antenna 131a. The satellite signal receiver 131b may determine the intensity of the received GNSS signal and demodulate the GNSS signal. The satellite signal receiver 131b may provide information on the intensity of the GNSS signal and the demodulated GNSS signal to the MCU 131c.

The MCU 131c may determine the location of the vehicle 1.

The MCU 131c may obtain information on the movement of the vehicle 1 from the motion sensor 37. For example, the GNSS receiver 131 may obtain information on the movement of the vehicle 1 from a six-axis sensor included in the suspension device of the vehicle 1.

The MCU 131c also obtains vehicle data 38 related to the driving of the vehicle 1 from the engine management system 31, the transmission control unit 32, the electronic braking system 33, and the electric power steering 34, etc.

The MCU 131c may identify the current location of the vehicle 1 based on the demodulated GNSS signal, information on the movement of the vehicle 1, and the vehicle data 38, and may provide the information about the current location of the vehicle 1 to the controller 140.

The controller 140 may operate in various acoustic modes such as an original sound enhancement mode 210, an original sound/noise balance mode 220, a noise minimization mode 230, and an automatic mode 240. The original sound enhancement mode 210, the original sound/noise balance mode 220, and the noise minimization mode 230 may be the same as the original sound enhancement mode 210, the original sound/noise balance mode 220, and the noise minimization mode 230 described with reference to FIG. 4.

In the automatic mode 240, the controller 140 may obtain information on the current position of the vehicle 1 from the GNSS receiver 131, and may select any one of a plurality of acoustic modes based on the current position of the vehicle 1.

For example, the controller 140 may operate in the original sound enhancement mode 210 when the vehicle 1 is located in a strong electric field area capable of receiving a strong broadcast signal. In addition, the controller 140 may operate in the noise minimization mode 230 when the vehicle 1 is located in a weak electric field area (e.g., a tunnel or an underground parking lot) where it is difficult to receive a broadcast signal. Information on the strong electric field area and the weak electric field area may be included in advance in the map stored in the AVN device 100.

As described above, the AVN device 100 may operate in the automatic mode 240 among various acoustic modes, and in the automatic mode 240, the AVN device 100 may control noise mixed in the acoustic signal based on the location of the vehicle 1.

Figure 8:
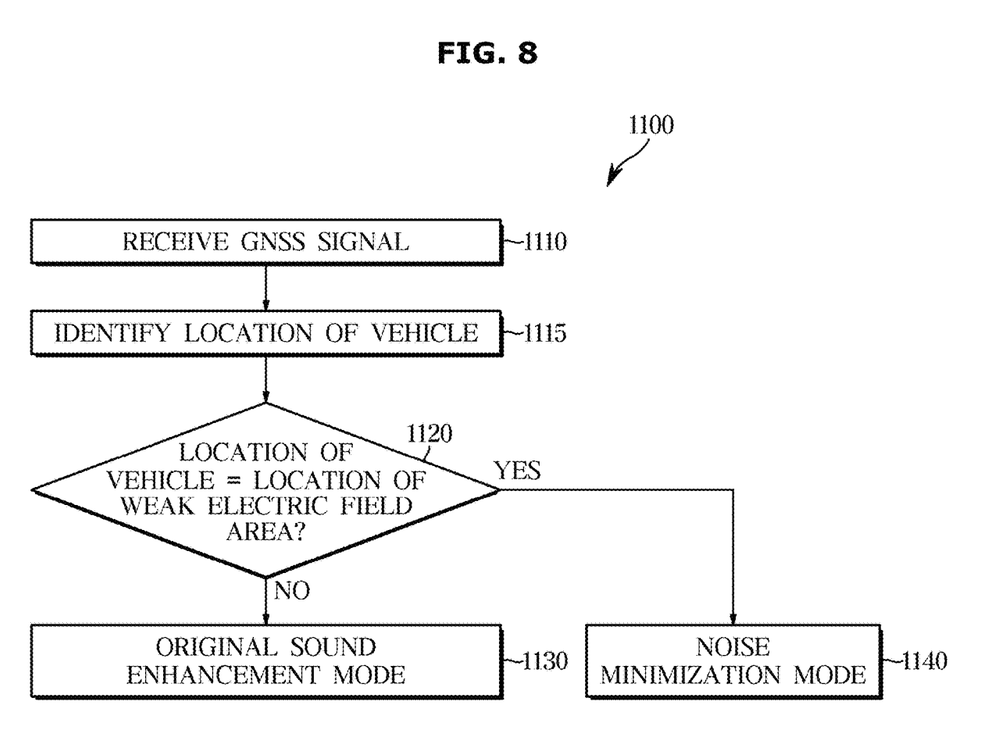
FIG. 8 illustrates another example of the operation of an AVN device included in a vehicle according to an embodiment.

FIG. 8 illustrates another example of the operation of an AVN device included in a vehicle according to an embodiment.

With FIG. 8, an operation 1100 of the AVN device 100 is described.

The AVN device 100 obtains a GNSS signal from an antenna device (1100).

The GNSS receiving antenna 131*a* may receive a GNSS signal and transmit the received GNSS signal to the AVN device 100.

The AVN device 100 identifies the location of the vehicle 1 (1115).

The AVN device 100 may obtain a GNSS signal, information on the movement of the vehicle 1, and vehicle data 38 related to the driving of the vehicle 1. The AVN device 100 may identify the location of the vehicle 1 based on the GNSS signal, information on the movement of the vehicle 1, and vehicle data 38 related to the driving of the vehicle 1.

The AVN device 100 determines whether the vehicle 1 is located in the weak electric field area (1120).

The AVN device 100 may identify whether the location of the vehicle 1 is within the weak electric field area. Information on the strong electric field area and the weak electric field area may be included in advance in the map stored in the AVN device 100.

When the vehicle 1 is not located in the weak electric field area (No in 1120), the AVN device 100 operates in the original sound enhancement mode 210 (1130).

In the original sound enhancement mode 210, the AVN device 100 may minimize noise removal for the acoustic signal received from the broadcast receiving antenna 111*a*. The AVN device 100 may transmit an acoustic signal with minimized noise removal to the speaker 36.

When the vehicle 1 is located in the weak electric field area (YES in 1120), the AVN device 100 operates in the noise minimization mode 230 (1140).

In the noise minimization mode 230, the AVN device 100 may maximize noise removal for an acoustic signal received by the broadcast receiving antenna 111*a*. The AVN device 100 may transmit an acoustic signal from which noise is removed to the maximum to the speaker 36.

In the above, it has been described that the AVN device 100 operates in an original sound enhancement mode or a noise minimization mode based on a comparison between GNSS signal intensity and reference intensity, but is not limited thereto. For example, the AVN device 100 may operate in any one of various modes based on a comparison between GNSS signal intensity and reference intensity. The AVN device 100 may operate in an original sound enhancement mode based on a GNSS signal intensity greater than or equal to the first reference intensity, operate in an original sound/noise balance mode based on a GNSS signal intensity less than the first reference intensity and greater than or equal to the second reference intensity and operate in a noise minimization mode based on a GNSS signal intensity less than a second reference intensity and greater than "0". Also, the AVN device 100 may operate in a silent mode based on non-reception of a GNSS signal.

According to an aspect of the disclosure, it is possible to provide a vehicle having a broadcast reception system that provide various acoustic modes to a driver according to a degree of noise removal, and a control method thereof.

According to an aspect of the disclosure, it is possible to provide a vehicle including a broadcast reception system that automatically adjusts the degree of noise removal according to the reception intensity of a broadcast signal, and a control method thereof.

Embodiments of the present disclosure have been described above. In the embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described embodiments, embodiments can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While specific embodiments have been described with respect to a limited number of embodiments, those of ordinary skill in the art, having the benefit of this disclosure, should appreciate that other embodiments can be devised which do not depart from the scope as disclosed herein. Accordingly, the scope should be limited only by the attached claims.

As described above, the disclosed embodiments have been described with reference to the accompanying drawings. Those of ordinary skill in the art to which the present disclosure pertains should understand that the present disclosure may be practiced in a form different from the disclosed embodiments without changing the technical spirit or essential features of the present disclosure. The disclosed embodiments are illustrative and should not be construed as limiting.

What is claimed is:

1. A vehicle comprising:
a Global Navigation Satellite System (GNSS) antenna;
a broadcast receiving antenna;
a speaker; and
an Audio/Video/Navigation (AVN) device,
wherein the AVN device is configured to
obtain a broadcast signal from the broadcast receiving antenna,
receive a GNSS signal from the GNSS antenna,
demodulate the broadcast signal into an acoustic signal,
remove a noise mixed in the acoustic signal based on an intensity of the GNSS signal,
operate in an acoustic mode among a plurality of acoustic modes,
remove the noise from the acoustic signal at different levels in different acoustic modes of the plurality of acoustic modes,
operate in a first acoustic mode of the plurality of acoustic modes in response to the intensity of the GNSS signal being greater than a reference intensity, and
operate in a second acoustic mode of the plurality of acoustic modes in response to the intensity of the GNSS signal being the reference intensity or less.

2. The vehicle according to claim 1, wherein the AVN device is configured to operate in different acoustic modes of the plurality of acoustic modes based on the intensity of the GNSS signal.

3. The vehicle according to claim 1, wherein a noise removal level in the second acoustic mode is greater than a noise removal level in the first acoustic mode.

4. The vehicle according to claim 1, wherein the AVN device further comprises a display device configured to allow a driver to select any one of the plurality of acoustic modes.

5. The vehicle according to claim 4, wherein the AVN device is configured to change to another acoustic mode of the plurality of acoustic modes having a noise removal level greater than the selected acoustic mode selected by the driver in response to the intensity of the GNSS signal being the reference intensity or less.

6. A control method of a vehicle having a Global Navigation Satellite System (GNSS) antenna, a broadcast receiving antenna, and a speaker, the control method comprising:
receiving a broadcast signal through the broadcast receiving antenna;
receiving a GNSS signal through the GNSS antenna;
demodulating the broadcast signal into an acoustic signal; and
removing a noise mixed in the acoustic signal based on an intensity of the GNSS signal,
wherein removing the noise includes
removing the noise from the acoustic signal at different levels in different acoustic modes of the plurality of acoustic modes,
operating in a first acoustic mode of the plurality of acoustic modes in response to the intensity of the GNSS signal being greater than the reference intensity, and
operating in a second acoustic mode of the plurality of acoustic modes in response to the intensity of the GNSS signal being the reference intensity or less.

7. The control method according to claim 6, wherein a noise removal level in the second acoustic mode is greater than a noise removal level in the first acoustic mode.

8. The control method according to claim 6, further comprising:
allowing a driver to select any one of the plurality of acoustic modes.

9. The control method according to claim 8, wherein the removing the noise comprises:
changing to another acoustic mode having a noise removal level greater than the selected acoustic mode selected by the driver in response to the intensity of the GNSS signal being the reference intensity or less.

10. A vehicle comprising:
a Global Navigation Satellite System (GNSS) antenna;
a broadcast receiving antenna;
a speaker; and
an Audio/Video/Navigation (AVN) device,
wherein the AVN device is configured to
obtain a broadcast signal from the broadcast receiving antenna,
receive a GNSS signal from the GNSS antenna,
demodulate the broadcast signal into an acoustic signal,
identify a location of the vehicle based on the GNSS signal,
remove a noise mixed in the acoustic signal based on whether the vehicle is located within a weak electric field area,
operate in an acoustic mode of a plurality of acoustic modes,
remove the noise from the acoustic signal at different levels in different acoustic modes of the plurality of acoustic modes,
operate in a first acoustic mode of the plurality of acoustic modes in response to the vehicle not being located in the weak electric field area, and
operate in a second acoustic mode of the plurality of acoustic modes in response to the vehicle being located in the weak electric field area.

11. The vehicle according to claim 10, wherein the AVN device is configured to operate in different acoustic modes of the plurality of acoustic modes based on whether the vehicle is located in the weak electric field area.

12. The vehicle according to claim 10, wherein a noise removal level in the second acoustic mode is greater than a noise removal level in the first acoustic mode.

13. The vehicle according to claim 10, wherein the AVN device further comprises a display device configured to allow a driver to select any one of the plurality of acoustic modes.

14. The vehicle according to claim 13, wherein the AVN device is configured to change to another acoustic mode of the plurality of acoustic modes having a noise removal level greater than the selected acoustic mode selected by the driver in response to the vehicle being located in the weak electric field area.

* * * * *